(12) United States Patent
Wankmueller (10) Patent No.: US 8,965,811 B2
(45) Date of Patent: Feb. 24, 2015

(54) METHODS AND SYSTEMS FOR USING PHYSICAL PAYMENT CARDS IN SECURE E-COMMERCE TRANSACTIONS

(75) Inventor: John R. Wankmueller, Great Neck, NY (US)

(73) Assignee: MasterCard International Incorporated, Purchase, NY (US)

( * ) Notice: Subject to any disclaimer, the term of this patent is extended or adjusted under 35 U.S.C. 154(b) by 528 days.

(21) Appl. No.: 12/573,567

(22) Filed: Oct. 5, 2009

(65) Prior Publication Data

US 2010/0088237 A1 Apr. 8, 2010

Related U.S. Application Data

(60) Provisional application No. 61/102,821, filed on Oct. 4, 2008.

(51) Int. Cl.
| | |
|---|---|
| *G06Q 20/14* | (2012.01) |
| *G06Q 20/12* | (2012.01) |
| *G06Q 20/34* | (2012.01) |
| *G06Q 20/38* | (2012.01) |
| *G06Q 20/40* | (2012.01) |
| *G06Q 30/06* | (2012.01) |

(52) U.S. Cl.
CPC ........... *G06Q 20/14* (2013.01); *G06Q 20/12* (2013.01); *G06Q 20/351* (2013.01); *G06Q 20/382* (2013.01); *G06Q 20/401* (2013.01); *G06Q 30/0601* (2013.01)
USPC ............ 705/79; 705/64; 705/67; 705/68; 705/71; 705/78; 235/379; 235/380

(58) Field of Classification Search
USPC ........ 705/65, 66, 67, 72, 74, 78, 79; 235/379, 235/380
See application file for complete search history.

(56) References Cited

U.S. PATENT DOCUMENTS

| | | | | |
|---|---|---|---|---|
| 5,555,303 | A * | 9/1996 | Stambler | 705/75 |
| 6,327,578 | B1 * | 12/2001 | Linehan | 705/65 |
| 6,330,544 | B1 * | 12/2001 | Walker et al. | 705/14.36 |
| 6,681,328 | B1 * | 1/2004 | Harris et al. | 713/175 |
| 6,857,566 | B2 * | 2/2005 | Wankmueller | 235/380 |
| 6,941,285 | B2 * | 9/2005 | Sarcanin | 705/67 |
| 7,039,809 | B1 * | 5/2006 | Wankmueller | 713/182 |
| 7,058,611 | B2 * | 6/2006 | Kranzley et al. | 705/64 |
| 7,103,575 | B1 * | 9/2006 | Linehan | 705/64 |
| 7,209,889 | B1 * | 4/2007 | Whitfield | 705/14.39 |
| 7,225,156 | B2 * | 5/2007 | Fisher et al. | 705/50 |
| 7,287,695 | B2 * | 10/2007 | Wankmueller | 235/383 |
| 7,292,999 | B2 * | 11/2007 | Hobson et al. | 705/65 |
| 7,455,222 | B2 * | 11/2008 | Beck et al. | 235/380 |
| 7,461,028 | B2 * | 12/2008 | Wronski, Jr. | 705/44 |
| 7,472,829 | B2 * | 1/2009 | Brown | 235/382.5 |

(Continued)

*Primary Examiner* — Mamon Obeid
(74) *Attorney, Agent, or Firm* — Buckley, Maschoff & Talwalkar LLC (57) ABSTRACT

Pursuant to some embodiments, methods, systems, apparatus, computer program code and means for conducting an online transaction by a user operating a computer are provided which include identifying, at the computer, that the user has selected a secure payment option during a transaction with a merchant. The computer is caused to enter a private session. During the private session, payment card data from a physical payment card held by the user is received, and the payment card data is forwarded to a payment provider to cause the payment provider to provide substitute payment card details to the merchant to complete the transaction.

10 Claims, 7 Drawing Sheets

(56) References Cited

U.S. PATENT DOCUMENTS

| | | | |
|---|---|---|---|
| 7,500,602 B2 * | 3/2009 | Gray | 235/380 |
| 7,505,941 B2 * | 3/2009 | Bishop et al. | 705/67 |
| 7,761,385 B2 * | 7/2010 | Hutchison et al. | 705/79 |
| 8,442,914 B2 * | 5/2013 | Killian et al. | 705/41 |
| 8,453,940 B2 * | 6/2013 | Diamond | 235/492 |
| 8,494,959 B2 * | 7/2013 | Hathaway et al. | 705/41 |
| 8,657,203 B2 * | 2/2014 | Diamond | 235/492 |
| 8,827,154 B2 * | 9/2014 | Hammad | 235/382 |
| 2001/0034720 A1 * | 10/2001 | Armes | 705/65 |
| 2003/0154139 A1 * | 8/2003 | Woo | 705/26 |
| 2007/0262138 A1 * | 11/2007 | Somers et al. | 235/380 |
| 2009/0048971 A1 * | 2/2009 | Hathaway et al. | 705/41 |
| 2010/0010916 A1 * | 1/2010 | Hutchison et al. | 705/26 |
| 2010/0088237 A1 * | 4/2010 | Wankmueller | 705/75 |
| 2010/0125509 A1 * | 5/2010 | Kranzley et al. | 705/17 |
| 2010/0125516 A1 * | 5/2010 | Wankmueller et al. | 705/35 |
| 2010/0299267 A1 * | 11/2010 | Faith et al. | 705/76 |
| 2010/0306081 A1 | 12/2010 | Hutchison et al. | |

\* cited by examiner

METHODS AND SYSTEMS FOR USING PHYSICAL PAYMENT CARDS IN SECURE E-COMMERCE TRANSACTIONS

RELATED APPLICATIONS

The present is based on, and claims benefit and priority to, U.S. Provisional Patent Application Ser. No. 61/102,821 filed on Oct. 4, 2008, the contents of which are hereby incorporated by reference in their entirety for all purposes.

FIELD

The present invention relates to payment accounts and products. In particular, the present invention relates to systems and methods for facilitating the use of physical payment cards in secure electronic commerce transactions.

BACKGROUND

Payment cards such as credit or debit cards are ubiquitous. For decades, such cards have included a magnetic stripe on which the relevant account number is stored. More recently, payment cards have been introduced which include integrated circuit ("IC") chips and memory. These chip payment cards can communicate with point of transaction devices via contact or contactless technology. Merchants around the world have point of sale terminals and card readers that allow payment card holders to easily purchase goods or services using their payment cards.

When a payment cardholder uses his or her physical payment card at a merchant location, the payment transaction is referred to as a "card present" transaction. Card present transactions are generally considered to have less likelihood of fraud or charge back risk because the full payment card details can be read by the merchant point of sale terminal during the transaction. For example, a point of sale terminal can read the "track 1" and "track 2" magnetic stripe data from a card. Chip card terminals can read (or receive wirelessly) similar detailed data from the chips in chip payment cards. This information serves to increase confidence that the cardholder is legitimate, the payment was intended, and that the card was valid. Also, in many situations, the cardholder is required to sign or confirm acceptance of the transaction before the transaction is completed.

Unfortunately, card present transactions have not been available for purchases made over the Internet. Instead, Internet transactions involving payment cards are considered to be "card not present" transactions. In a typical on-line purchase transaction, a cardholder interacts with a merchant Website and selects one or more products to purchase. The order details are commonly placed in an online "shopping cart". When the cardholder is ready to complete the transaction, he or she selects a payment mechanism (e.g., he or she may choose to pay with a Visa® payment card, a MasterCard® payment card, an American Express® payment card, or some other payment means). The cardholder then enters their name, billing address, payment card number, and, in some situations, a control value printed on the face of the payment card (sometimes referred to as a "Card Verification Value or CVV", a "Card Verification Code or CVC", etc.). The cardholder then clicks "submit" and the payment information is forwarded to the payment card issuer (or issuer agent) for authorization processing. If the transaction is authorized, the goods are shipped and the transaction is complete.

Such "card not present" transactions involve a number of different risks. First, from the cardholder's perspective, there is a risk that the merchant inappropriately stores or uses the cardholder's payment card information (e.g., to defraud the customer, or to inadvertently allow the payment card information to be stolen or misused). On the Internet, it is difficult for consumers to know the reputation of the merchant they are transacting with.

Further, merchants are frequently exposed to high charge back risks. It is relatively easy for a cardholder to dispute online transactions and cause a charge back or return. Charge backs hurt merchants in lost sales, as well as higher interchange rates with their issuer or issuer processor. Further, high charge back rates can cause a merchant to lose their merchant account and their ability to accept payment cards.

It would be desirable to provide an ability to conduct "card present" types of transactions in online commerce.

DESCRIPTION

Embodiments of the present invention relate to systems, methods, processes, computer program code, and means for using physical payment cards to conduct transactions over a network. In some embodiments, the physical payment card can be a credit, debit or stored value card, and may be a magnetic stripe, contactless chip, or contact chip payment card.

Features of some embodiments of the present invention will be described by reference to FIG. 1, which is a block diagram of a system 100 pursuant to some embodiments. As shown, a payment cardholder may operate a user device 102 (such as a personal computer, mobile device, or the like) which is in communication with a merchant 108 over a network 120 such as the Internet. The merchant 108 may be any type of Internet retailer offering goods or services for purchase by remote consumers as is known in the art. The shopping experience between the cardholder and the merchant 108 is currently known in the art.

Embodiments of the present invention relate to the purchase transaction that occurs between the payment cardholder and the merchant 108 once the cardholder has selected one or more items to purchase, and when the cardholder is ready to complete the purchase transaction. In particular, processing, in some embodiments, begins when the customer chooses to check out and purchase using a new payment option referred to herein as a "Remote Wallet Payment". For example, in some embodiments, the customer may be presented with a checkout screen or shopping cart that allows several payment choices, such as "Visa", "MasterCard", "American Express", "PayPal", and "Remote Wallet Payment." (Those skilled in the art will recognize that the term is used simply as an illustrative example, other brand names or terms may be used).

If the customer selects "Remote Wallet Payment", a purchase transaction pursuant to embodiments of the present invention is initiated. Pursuant to some embodiments, by the act of clicking on or otherwise selecting the "Remote Wallet Payment" option, a payment transaction will be initiated which allows (i) the cardholder to use a physical payment card, (ii) payment card data will not be transmitted directly from the cardholder to the merchant, instead, the payment card information will be transmitted from a payment provider as described further below, and (iii) in some embodiments, the payment card data will be prevented from being stored at the cardholder's user device 102. These steps will be detailed below.

Figure 1:
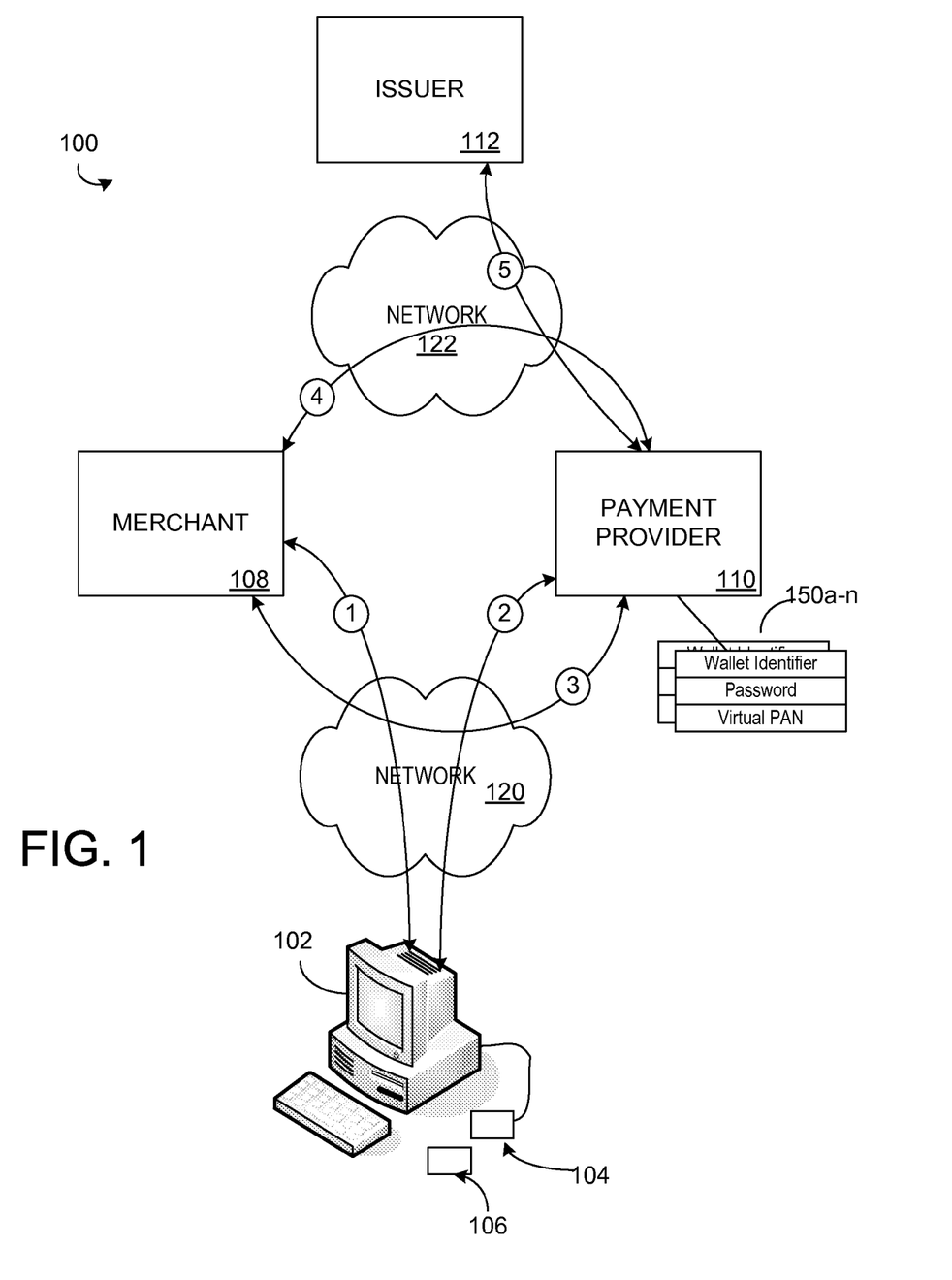
FIG. 1 is a block diagram depicting a payment system configured pursuant to some embodiments.

If the customer selects the "Remote Wallet Payment" option, processing at item (1) of FIG. 1 occurs. In one embodiment, this customer action initiates an interaction between the customer's user device 102 and the merchant 108 Website or a Website operated by the payment provider (e.g., a remote wallet Website) so the customer's user device 102 can verify that the merchant Website and/or the remote wallet Website is trusted. This can be accomplished, for example, using public key or shared key infrastructure known in the art, such as SSL, TLS or shared key technology. In one embodiment, the click or selection by the customer of the "Remote Wallet Payment" option on the merchant Website causes a signal to be sent to the customer's user device 102 (e.g., by a script or other control action embedded in the HTML of the merchant Webpage).

Pursuant to some embodiments, this signal is captured by a listener script operating on the consumer's user device 102 (e.g., which monitors the TCP/IP port of the user device 102), and a flag or other indicator is set that a Remote Wallet Payment transaction has been initiated. The flag or other indicator causes the user device 102 to enter a secure transaction mode. Optionally, when entering into private mode, the user device 102 may provide a signal, that only the security chip in the computer controls, to the consumer. In this way the consumer can be aware that the secure mode is enabled. Entry into the secure transaction mode causes several processes to occur. First, the computer is placed in a mode in which data entered by the customer during the secure transaction is not captured or saved to a memory of the user device 102. That is, the user device 102 enters a mode in which the interaction between the customer and the payment provider is kept private. Next, when the user device 102 enters the secure transaction mode, the user device 102 initiates a communication session (shown as item (2) in FIG. 1) with a payment provider 110. Further, in establishing the communication session with the payment provider 110, the user device 102 automatically causes a security chip or module in the user device 102 to mutually authenticate itself to the payment provider 110.

If the user device 102 (or the security chip in the user device 102) and the payment provider 110 mutually authenticate each other, the user device 102 (or the security chip in the computer) sets up a separate secure communication channel directly with the remote payment provider 110, bypassing the operating system of the user device 102. The user device 102 is now set to capture customer input from the user device 102 keyboard or other input device until the remote payment provider 110 indicates input is completed. In effect this implements and defines the initiation and termination of a secure-user input or secure keyboard session. For the first time, this describes a method for a user device 102 to know when to not send user input to the computer's operating system, enabling secure input from a user device 102 without required user interaction. In some embodiments, this processing is performed automatically (without any requirement for the customer to initiate the secure mode) and privately.

Once the user device 102 and the remote payment provider 110 have entered the secure session (again, shown as item (2) of FIG. 1), the cardholder (operating user device 102) is presented with a login screen which includes, for example, instructions for the cardholder to swipe (in the case of a magnetic stripe payment card), or tap or insert (in the case of a contactless or contact chip payment card) their payment card 106 on a reader 104 in or connected to their user device 102.

When the user swipes, taps or inserts the payment card 106 in the reader 104, that action is used to cause a request message to be sent to the remote payment provider 110 from the user device 102. The request message includes data read from the payment card 106. The request message is received by the remote payment provider 110 (over the secure channel shown as (2)) and is used by the payment provider 110 to automatically log the cardholder into a remote electronic wallet 150 (or account) maintained by the payment provider 110 on behalf of the cardholder. In some embodiments, the cardholder's remote electronic wallet 150 is located or identified using the Primary Account Number (or "PAN") of cardholder's payment card 106 (e.g., shown as the wallet identifier in the electronic wallet 150 of FIG. 1). That is, the PAN may be used as the cardholder's remote wallet access key. In some alternative embodiments, the cardholder may optionally be prompted to enter a password to access or activate the cardholder's remote electronic wallet 150.

The physical payment card 106 that was tapped, inserted or swiped in the reader 104 attached to the user device 102 becomes the cardholder's payment choice in the remote electronic wallet 150 of the cardholder. If the remote electronic wallet 150 is unable to validate the payment card data (received in the request packet sent in (2)), the remote electronic wallet 150 may not display all of the payment cards associated with the remote electronic wallet 150. Instead, the remote wallet will attempt to obtain an authorization from the payment card issuer 112 before revealing any private data to the cardholder.

In some embodiments, once the cardholder has successfully logged in to his or her remote electronic wallet 150 on the remote payment provider 110 server, the user device 102 may terminate the secure transaction mode (e.g., the computer may revert to normal operations in which the operating system is able to view and save data as normal).

Pursuant to some embodiments, allowing a cardholder to tap, swipe or insert a physical payment card 106 in a reader 104 makes the cardholder's use and access to their remote electronic wallet 150 much safer and easier. In some embodiments, an alternative mechanism for accessing the remote electronic wallet 150 may be provided in the event that the cardholder does not have a reader 104 in communication with their user device 102. For example, in some embodiments, cardholders may 1) type in their remote electronic wallet user id, 2) enter their remote electronic wallet password, 3) wait for the remote electronic wallet 150 to find and then display over the communication link the list of available payment options and 4) navigate with a mouse or other device to choose a payment account to use, all without secure entry protection.

The tap, insertion or swipe of a payment card 106 provides an easy way for a cardholder to login to the remote electronic wallet 150 that ultimately, through embodiments of the present invention, also provides "card-present" data to the payment account issuer 112 without revealing actual payment card data to the electronic commerce merchant 108. If the optional password is included, the cardholder is authenticated to all parties for this transaction. Advantageously, the payment card 106 that was tapped, inserted or swiped in the reader 104 becomes the payment account that will be used for the transaction. Even though this is a remote electronic commerce transaction, the cardholder takes out and taps, inserts or swipes the physical payment card 106 they wish to use for this electronic commerce transaction, like a face to face (or "card present") transaction.

Once the cardholder has been successfully logged into the remote electronic wallet 150, the electronic wallet 150 assigns (or has previously assigned) an electronic use only account (referred to as a "virtual PAN" or "VPAN") to the cardholder's payment card account. The VPAN is a bankcard-formatted PAN that has a bank identification number ("BIN") that identifies the payment provider 110 as the issuer (so any authorization requests involving the VPAN also involve the payment provider 110). The payment provider 110 causes a purchase request message to be forwarded to the merchant 108 (shown as message (3) in FIG. 1), with the purchase transaction details and the VPAN as the payment card account to make the purchase. The remote electronic wallet 150 also creates dynamic transaction data that is unique to the electronic commerce transaction to prevent replay attacks, for example by generating MasterCard Universal Cardholder Authentication Field (UCAF) data. This dynamic data is included in the purchase request message that is transmitted from the payment provider 110 to the merchant 108 at (3). In this manner, the merchant 108 never receives or is aware of the physical payment card 106 details—the merchant 108 only receives a VPAN and dynamic data from the payment provider 110.

In some embodiments, the remote electronic wallet 150 saves preferably in encrypted form, for later processing, the Primary Account Number (PAN), expiry date, and track data from the real physical payment card 106 received from the user device 102.

The transaction process continues at message (4) where the merchant 108 sends the VPAN and dynamic UCAF data it received for the purchase transaction through a network (such as a bankcard payment network, e.g., the MasterCard Bank-Net network or the like) to obtain authorization, which will be routed to the issuer of the VPAN (which, as discussed above, is the payment provider 110). The payment provider 110 receives the authorization request from the merchant 108.

Upon receipt of the authorization request (at item (4)), the remote electronic wallet 150 finds the original tapped, inserted, or swiped transaction data with the real payment card PAN and card data, remembers the VPAN related data, and forms a changed authorization request for this sale using the real PAN and track data from the original message received from the user device 102 (from original message (2)). In some embodiments, this changed authorization request includes dynamic data.

The payment provider 110 then (at message (5)) sends the modified or updated authorization message to a payment network 122 for authorization processing. Because the updated authorization message now has the real PAN, it is routed to the issuer 112 of the physical payment card 106. The issuer 112 receives message data that has all the authorization data normally provided in a face to face (or "card present") physical transaction, such as dynamic track data, and optionally other additional electronic commerce data, such as the VPAN and other indicators or e-commerce data.

The issuer 112, upon receipt of the real payment card 106 PAN, verifies the normal data (that was originally generated by the cardholder tapping, swiping or inserting the payment card 106 into a reader 104 at their user device 102). As in any normal transaction, the issuer checks the user's account status and makes an authorization decision. The issuer 112 then sends its authorization response message back to the payment provider 110 and the remote electronic wallet 150 that sent the request.

The payment provider 110 and the remote electronic wallet 150 receive this message from the issuer 112 with the real PAN and retrieves the saved VPAN and UCAF electronic commerce data and sends a modified authorization response message with VPAN and UCAF electronic commerce data back to the merchant 108. In this way the merchant 108 only sees electronic commerce account data and saves any UCAF or other data as proof of card presence for the electronic commerce transaction.

Embodiments of the present invention provide, for the first time, true "card presence" data to the payment card issuer for a non face to face electronic commerce transaction making it a much more secure electronic commerce transaction. Embodiments do not involve any change to the merchant electronic commerce acceptance infrastructure.

Figure 2:
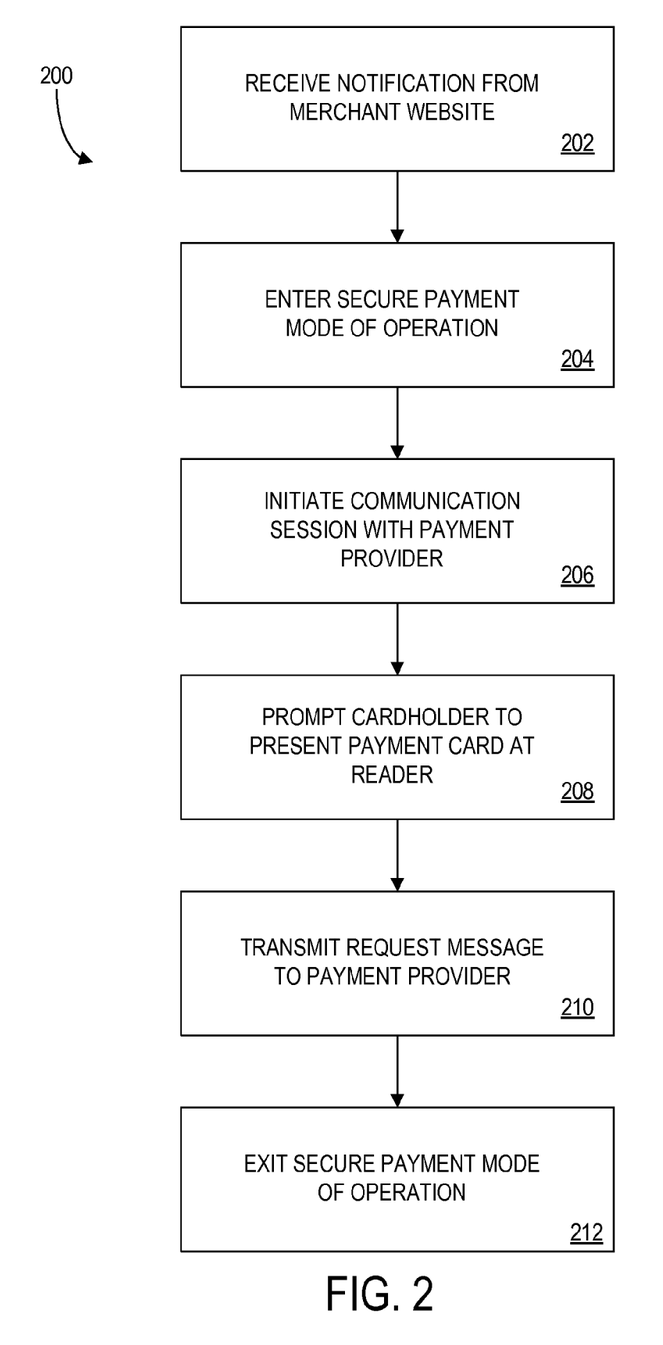
FIG. 2 is a flow diagram depicting a transaction process according to some embodiments.

Reference is now made to FIG. 2, which is a flow chart that illustrates a method that may be performed according to some embodiments. The flow charts in FIG. 2 and the other figures described herein do not imply a fixed order to the steps, and embodiments of the present invention can be practiced in any order that is practicable. Moreover, the methods may be performed by any of the devices described herein. The method shown in FIG. 2 may be performed, for example, by the user device 102 of FIG. 1, although those skilled in the art will recognize that the elements of FIG. 2 and the other FIGS. described herein may be performed by different parties. For example, each element might be performed by a different party (e.g., by an issuer, an account processor, a merchant, or any other agent or party). Moreover, any single element might be performed by multiple parties.

Process 200 begins at 202 where a software "listener" or other script or application installed on the user device 102 receives or otherwise detects a notification from a merchant website that a user operating the user device 102 has elected to initiate a secure purchase transaction pursuant to embodiments of the present invention. For example, the notification may be received once the user has clicked on or otherwise selected a payment option using the features of the present invention (which may trigger, for example, the issuance of a notification by, for example, Javascript, ActiveX or some other scripting language). In some embodiments, the notification message includes information used by the user device 102 to enter a secure payment mode of operation. Further, in some embodiments, the notification message includes posting or delivery instructions which will be passed to the payment provider device 110 allowing the payment provider device 110 to post or transmit payment information to the merchant (e.g., as discussed below in conjunction with FIG. 3).

At 204, the user device 102, in response to receipt of the notification, is placed in a secure payment mode of operation in which cardholder data that is subsequently entered is not accessible to other routines or applications that may be running on the user device 102. For example, the user device 102 may be placed in a mode of operation in which a security chip or security module controls communication between any input devices (such as keypads or card readers) and the remote payment provider device 110. At 206, the user device 102 (or, in some embodiments, a security chip or security module of the user device 102) initiates a communication session with a remote payment provider device 110. In some embodiments, this communication session is a secured session and may be secured using shared private keys (e.g., using DES) or using some other encrypted communications techniques.

Once a communications session has been initiated, processing continues at 208 where software installed in or associated with the user device 102 (e.g., such as software associated with a security chip or security module) causes a display to be presented prompting the user or cardholder to present their desired payment card (e.g., such as payment card 106 of FIG. 1) to the attached card reader (e.g., such as reader 104 of FIG. 1). The card reader (which may be a magnetic stripe reader, a contact reader, or a contactless reader) reads payment card data from the payment card and the card data is used by the security chip or security module to create a request message which is transmitted to the remote payment provider 110 at 210. For example, the request message may include the track 1 and track 2 data (or other card data) read from the payment card, which data includes the primary account number (or "PAN") and expiry date of the payment card. The data is transmitted to the remote payment provider 110 over the communications session established previously at 206. Further processing of the request message is performed at the payment provider device 110 (and discussed further below in conjunction with FIG. 4).

Once the request message has been successfully transmitted, processing continues at 212 where the user device 102 is caused to exit the secure payment mode of operation, thereby allowing the user device 102 to be used as normal. In some embodiments, no payment data is stored at or accessible on the user device 102, thereby improving the security of the payment data. In some embodiments, session control of the user's browser is returned to the merchant 108, where the merchant 108 may present the user with a final checkout Web page. At this point, the merchant 108 has received a purchase request message (as discussed in step 308 of FIG. 3, below) from the payment provider 110 which includes a VPAN and other payment information which is used to populate the final checkout Web page. At this point, the user may be prompted to finalize the purchase transaction using the VPAN and other payment details. If the user chooses to finalize the purchase transaction, the merchant completes an authorization request and, from the user's perspective, the checkout process completes as normal.

Figure 3:
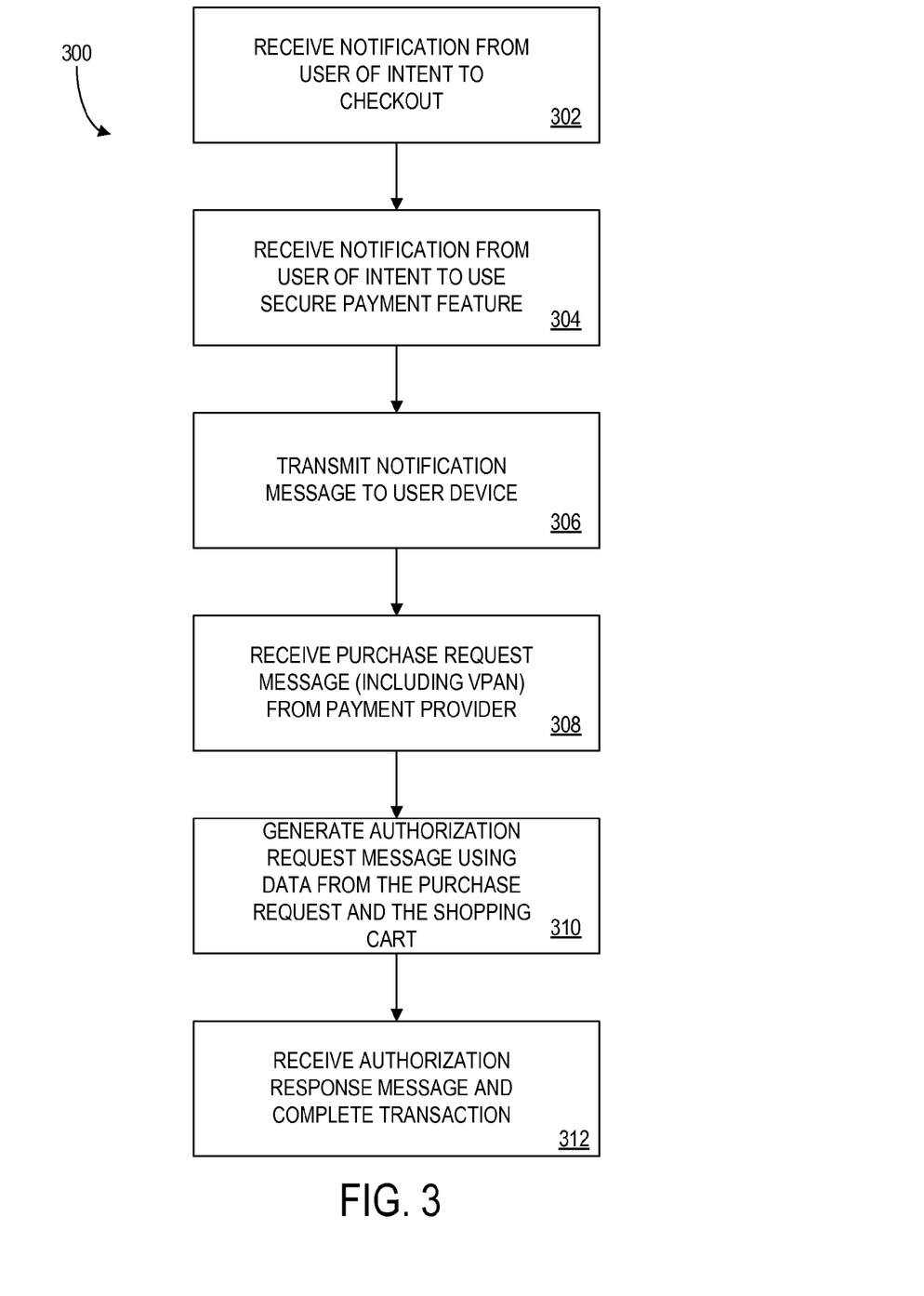
FIG. 3 is a further flow diagram depicting a transaction process according to some embodiments.

Reference is now made to FIG. 3 which shows a process 300 that may be performed by a merchant device 108 pursuant to some embodiments. For example, process 300 may be performed by a merchant web server (or other servers and systems used to host or operate a merchant web site or ecommerce site on behalf of a merchant). Pursuant to some embodiments, the merchant may be a merchant device such as merchant device 108 of FIG. 1, configured to operate pursuant to embodiments of the present invention.

Process 300 begins at 302 where the merchant device 108 receives a notification from a user of the user's intent to "check out" or purchase one or more items from the merchant. For example, this may be received in a merchant shopping cart system when the user (interacting with the merchant shopping cart via the Internet) clicks or selects a "check out" button, icon or hyperlink. The selection of the link or option may cause the merchant to display a variety of payment options to the user, one of which may be a secure payment checkout option pursuant to embodiments of the present invention. At 304, processing includes receiving notification from the user of intent to use the secure payment feature. For example, this notification may be indicated by the user's selection of a secure payment icon, button or hyperlink. By selecting or otherwise choosing the secure payment icon, the user indicates their intent to proceed with checkout and payment using the secure payment features of the present invention.

Selection of the secure payment feature at 304, in some embodiments, causes the automatic generation of a notification message which is transmitted to the user's Web browser (e.g., as a Javascript, ActiveX or other scripting command). The notification message, in some embodiments, includes information about the transaction (e.g., such as a transaction identifier and, in some embodiments, a posting URL or address to which payment card details can later be posted by the payment provider, as discussed below in conjunction with FIG. 4). As discussed above in conjunction with FIG. 2, the notification message is read or received by the user device 102 and is processed to place the user device 102 in a secure operating mode. At this point in processing, the merchant 108 has not yet received any payment details from the user. Instead, the merchant 108 has only received notification that the user intends to use a secure payment option.

Processing continues at 308 where the merchant 108 receives a purchase request message (including a VPAN) from the payment provider 110. For example, the purchase request message may be received by the merchant at the posting URL or address designated by the merchant in the notification message sent to the user device 102 (which was subsequently passed on to the payment provider 110 via the user device 102). The purchase request message, in some embodiments, includes sufficient detail for the merchant to create a payment authorization request message for the user's purchase (e.g., including a VPAN, an expiry date, and in some embodiments, dynamic data). In some embodiments, processing at 308 may include presenting a final checkout confirmation page to the user, allowing the user to review the details of the purchase and to accept the checkout prior to payment processing.

If the user accepts the purchase details, processing continues at 310 where the merchant 108 generates an authorization request message using data from the purchase request and the shopping cart, and submits the authorization request message as a normal purchase request. Because the payment account number associated with the authorization request message is the VPAN assigned by the payment provider (which includes a BIN number assigned to the payment provider), the authorization request message will be routed to the payment provider 110 for authorization. The details of the authorization processing are described below in conjunction with FIG. 4.

Processing at the merchant 108 continues at 312 where an authorization response message is received. If the transaction is approved or authorized, the merchant completes the transaction and arranges to fulfill the goods or services purchased by the user. If the authorization fails, the merchant provides further instructions to the user.

Pursuant to some embodiments, the merchant never receives the user's actual payment card data—instead, the merchant receives the VPAN and other data provided by the payment provider 110, thereby ensuring security and privacy of the user's payment information.

Figure 4:
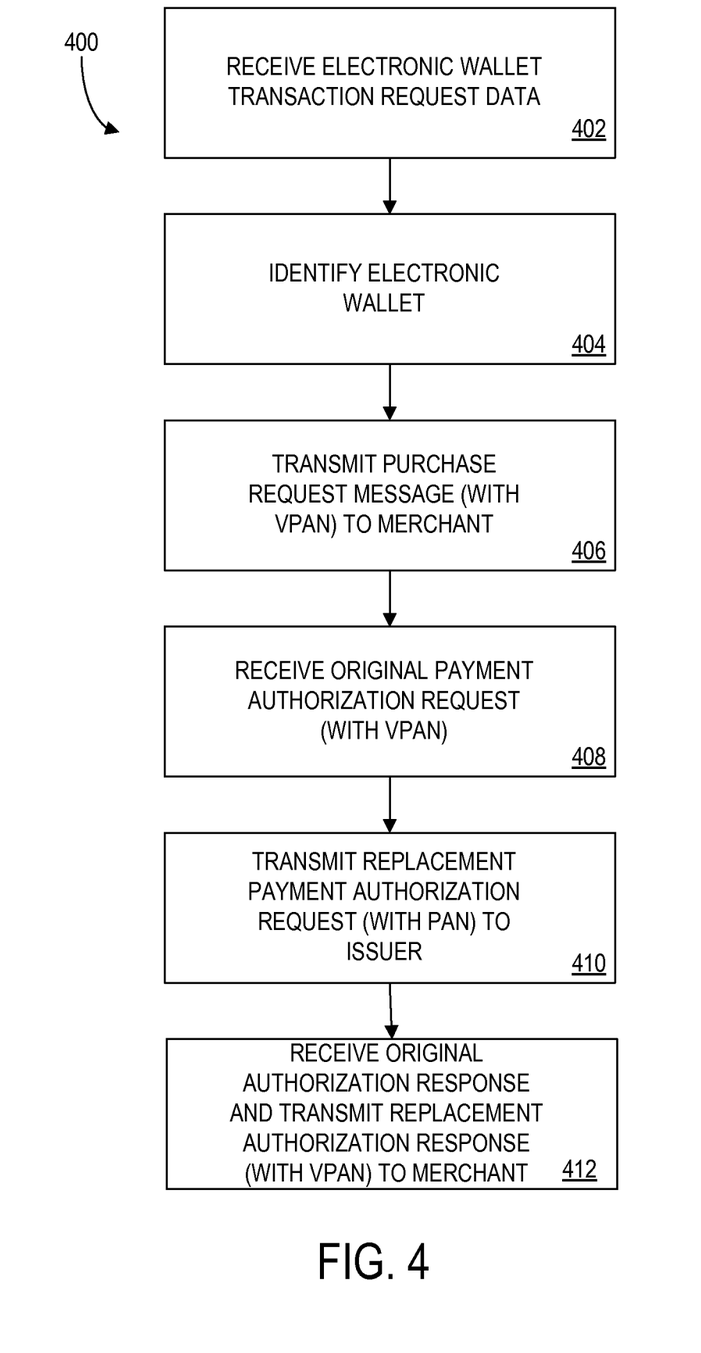
FIG. 4 is a further flow diagram depicting a transaction process according to some embodiments.

Reference is now made to FIG. 4, which is a process 400 performed by a payment provider 110 pursuant to some embodiments. For example, process 400 may be performed by a payment provider web server (or other servers or systems operated by or on behalf of a payment provider such as the payment provider 110 of FIG. 1). Process 400 begins at 402 where the payment provider 110 receives an electronic wallet transaction request message including request data. The request message may be received from a consumer operating a user device 102. For example, the request message may be received from a consumer operating a user device 102 after the user has selected a secure payment option at a merchant website and after the merchant 108 has sent a notification message to the user device 102 (e.g., such as at step 206 of FIG. 2). In some embodiments the data is received in a secure session established between a user device 102 and the payment provider 110.

In some embodiments, the request message includes information identifying the user's payment card (including the PAN, expiry and other information read from the physical payment device at a reader associated with the user device 102). Further, the request message may include information provided by the merchant 108 which will allow the payment provider 110 to post or otherwise provide payment data directly to the merchant 102.

Figure 6:
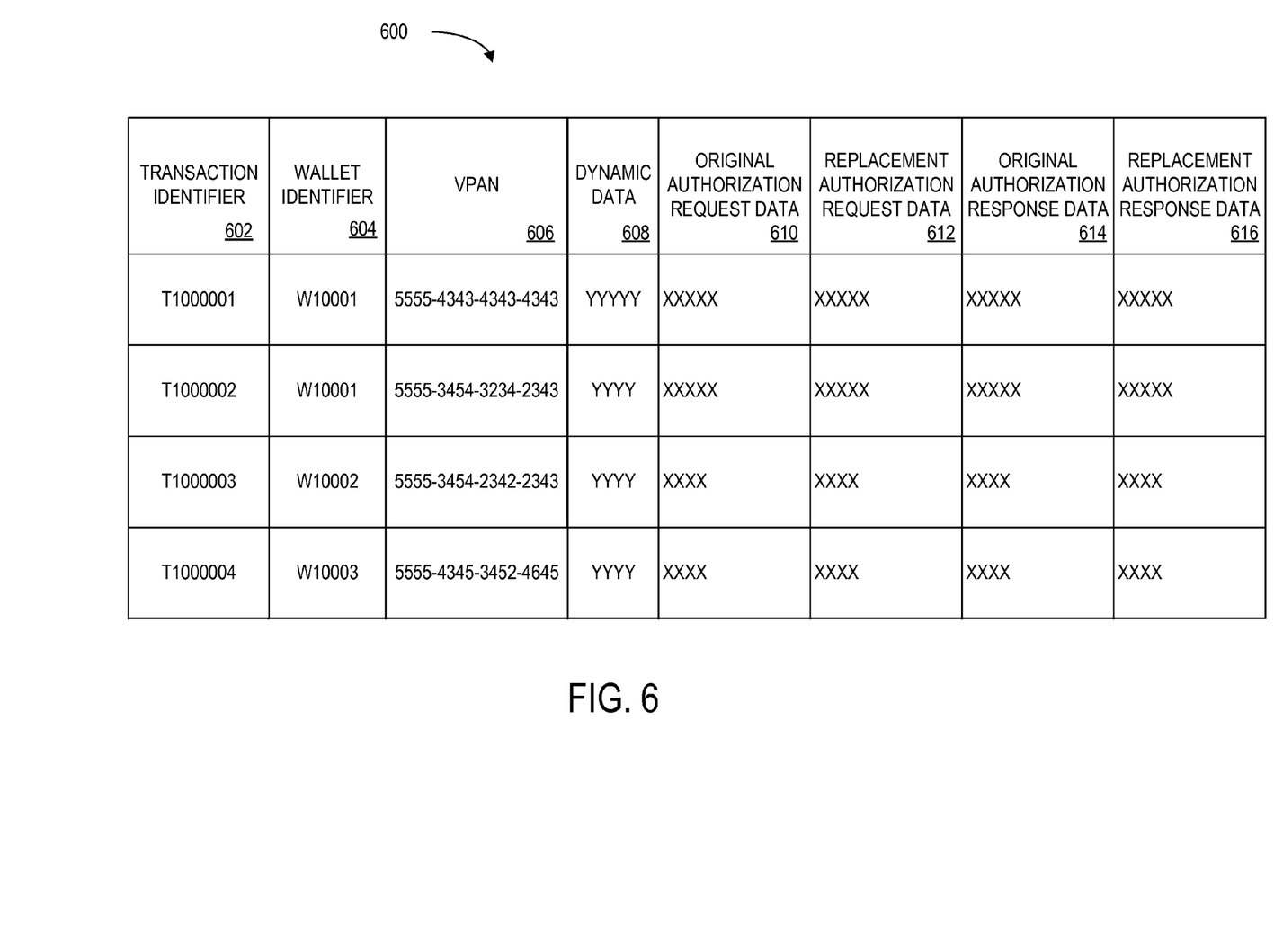
FIG. 6 is a tabular representation of a portion of a transaction database according to some embodiments.

Processing continues at 404 where the payment provider 110 uses data received at 402 to identify the appropriate electronic wallet (e.g., the electronic wallet associated with the user operating user device 102). Processing at 404 may include prompting the user for a password or other identifying information, or it may simply include identifying the wallet using information provided in the request message received at 402. Once the appropriate electronic wallet is identified, processing continues at 406 where the payment provider creates a purchase request message (using information from the electronic wallet, including a VPAN, expiry date of the VPAN and any dynamic data) and transmits the purchase request message to the merchant 108 (e.g., by posting or providing the data to an address previously specified by the merchant, so that the data can be directly inserted into or associated with the relevant checkout or shopping cart data). A record of the assigned VPAN and transaction information is stored in a data store such as transaction database 600.

Processing continues at 408 where the payment provider 110 receives an authorization request message, requesting authorization of a transaction including the VPAN. The payment provider 110 uses the VPAN to look up the transaction record and to swap out the VPAN, VPAN expiry and other VPAN related data with the cardholder's physical card PAN, expiry and dynamic data to create a replacement authorization request message. The replacement authorization request message is submitted to the issuer associated with the PAN for authorization processing at 410.

At 412, the payment provider 110 receives an response to the replacement authorization request message (e.g., the payment provider receives a response message from the issuer of the PAN indicating if the account associated with the PAN has sufficient balance available to complete the transaction). The payment provider 110, using data from the authorization database 700, replaces the PAN and other payment related information in the authorization response message with the VPAN and other VPAN data to create a replacement authorization response message. The replacement authorization response message is transmitted to the merchant 108 to complete the transaction.

In this manner, the cardholder only provides his or her physical payment card details to a trusted party—the payment provider 110. The merchant 108 never receives actual physical payment card details, it only receives a VPAN and related VPAN details. Further, the cardholder, the merchant and the issuer enjoy the benefits of a card-present transaction, with the reduced ability for fraud and other benefits.

Figure 5:
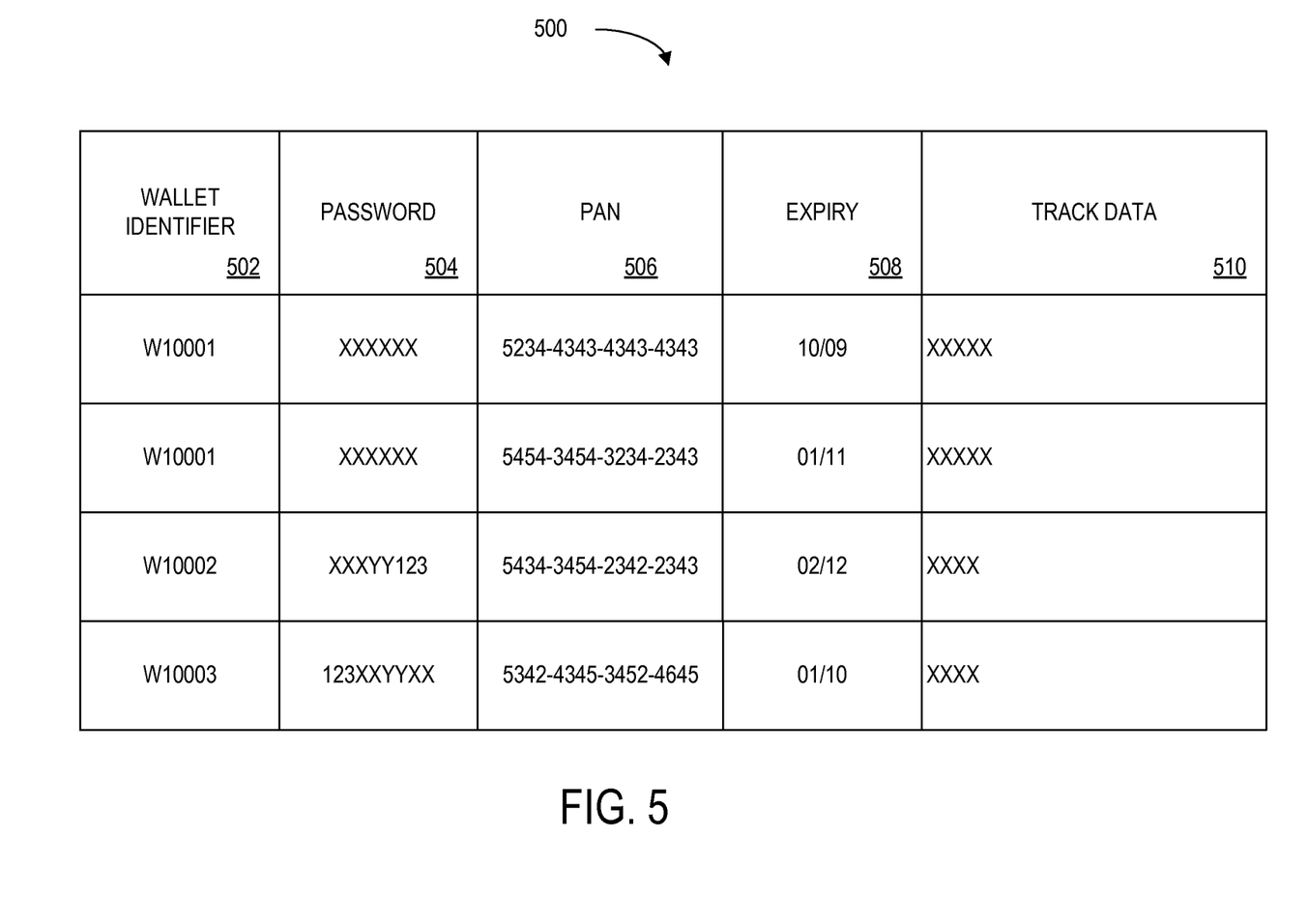
FIG. 5 is a tabular representation of a portion of a wallet database according to some embodiments.

Reference is now made to FIG. 5, which is a portion of a tabular representation of a wallet database 500 that may be stored at (or accessible to) the payment provider 110 according to some embodiments of the present invention. The table of FIG. 5 includes entries identifying individual electronic wallets that may be accessed and used in payment transactions pursuant to the present invention. The table 500 defines fields 502-510 for each entry. The fields specify a wallet identifier 502 (used to uniquely identify individual electronic wallet accounts established for users of the system of the present invention), a password 504 (used, in some embodiments, to authenticate a user's request for access to the wallet account identified by wallet identifier 502), one or more primary account numbers (PANs) 506 (which are payment card account identifiers associated with one or more physical payment cards associated with the user of the wallet account identified by the wallet identifier 502), one or more PAN expiry dates 508 (which are the expiration dates associated with each of the PANs 506), and track data 510 (such as magnetic stripe or payment card chip data read from the payment card associated with the PAN 506).

The information in the wallet database 500 may be created, for example, when a cardholder uses features of the present invention to make a purchase transaction. In some embodiments, the information in the wallet database 500 may be created during the course of a transaction (e.g., when a cardholder swipes or taps his payment card in or on a reader associated with a computer, such as at step 208 of process 200, discussed above). In some embodiments, the information in the wallet database 500 is created prior to a transaction. Those skilled in the art will appreciate that other data fields may also be included in the wallet database 500. For example, the wallet database 500 may include customer information (such as name, address, and phone number, etc.), as well as additional security or profile information.

Reference is now made to FIG. 6, which is a portion of a tabular representation of a transaction database 600 that may be stored at (or accessible to) the payment provider 110 according to some embodiments of the present invention. The table of FIG. 6 includes entries identifying individual transactions that are being processed (or that have been processed) pursuant to the present invention. The table 600 defines fields 602-616 for each entry. The fields specify a transaction identifier 602 (used to uniquely identify individual electronic wallet transactions that are being processed or that have been processed pursuant to embodiments of the present invention), a wallet identifier 604 (corresponding to a wallet identifier 502 of FIG. 5, and used to associate transaction data with a particular wallet), a VPAN 606 (representing the virtual payment account number assigned to the transaction identified by transaction identifier 602), dynamic data 608 (including any dynamic data generated for use with the VPAN 606 in the transaction 602), original authorization request data 610 (including the authorization request data from the authorization request message received from a merchant), replacement authorization request data 612 (including the authorization request data from the authorization request message with the actual PAN rather than the VPAN and which is sent to the issuer for authorization), original authorization response data 614 (including the original authorization response received from the issuer associated with the PAN), and replacement authorization response data 616 (including the authorization response with the VPAN).

The information in the transaction database 600 may be created, for example, during the course of a transaction pursuant to the present invention. For example, some fields may be created during processing of message "3" in FIG. 1 (e.g., the original authorization request message received in message "3" may be stored in field 610), and other fields may be created during processing of message "5" in FIG. 1 (e.g., the original authorization response message received in message "5" may be stored in field 614, etc.).

Those skilled in the art will appreciate that other data fields may also be included in the transaction database 600. For example, the transaction database 600 may also include a merchant URL or posting instructions describing where (and how) the payment provider 110 should post or submit the updated authorization response message back to the merchant upon receipt.

Figure 7:
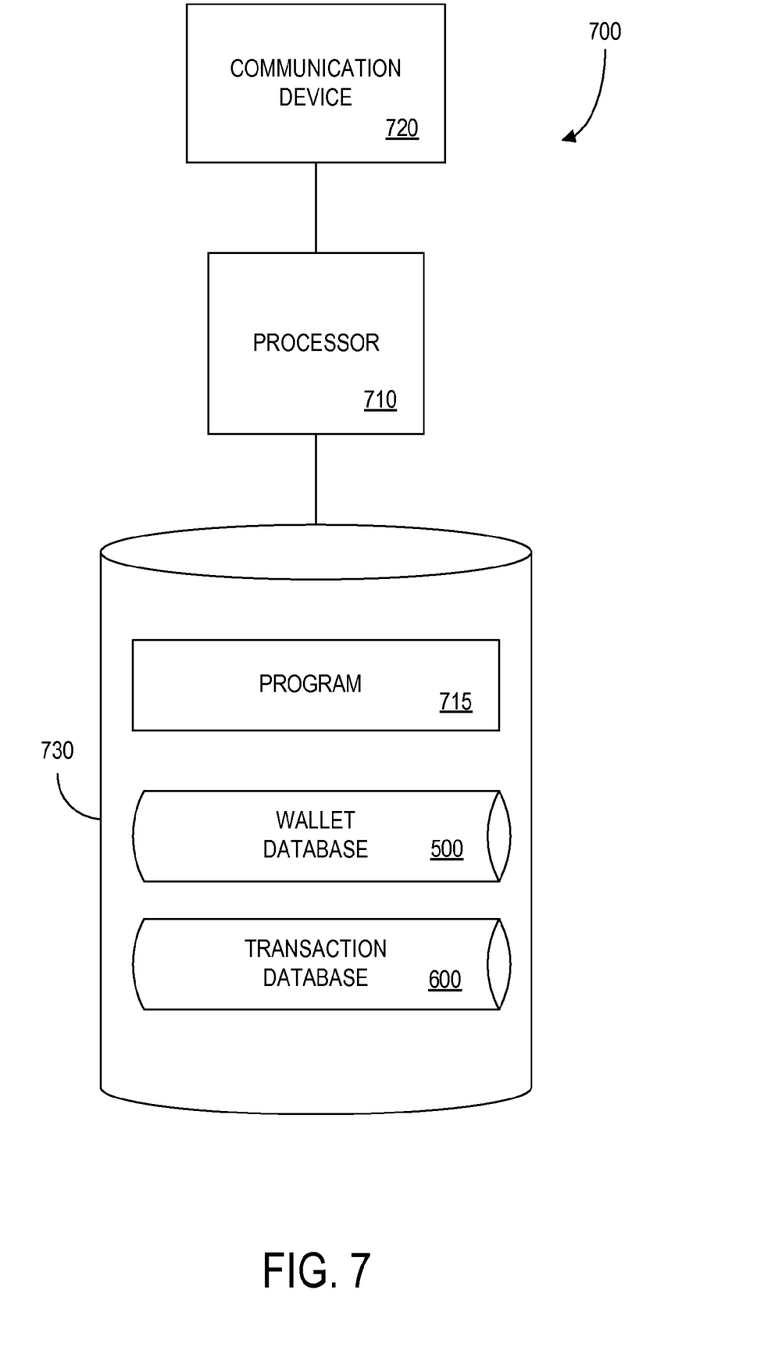
FIG. 7 is a block diagram of a payment provider device according to some embodiments.

FIG. 7 is a block diagram of an apparatus 700 that may be descriptive of any of the devices shown in FIG. 1 according to an embodiment of the present invention. More particularly, as shown, the apparatus 700 is shown as it may be configured and used by the payment provider 110. The apparatus 700 comprises a processor 710, such as one or more INTEL® Pentium® processors, coupled to a communication device 720 configured to communicate via a communication network (not shown in FIG. 7). The communication device 720 may be used to communicate, for example, with user devices 102, merchant devices 108, and/or issuer devices 112.

The processor 710 may also be in communication with a local input device (not shown in FIG. 7). The local input device may comprise, for example, a keyboard, a mouse or other pointing device, a switch, an infrared port, a docking station, and/or a touch screen. Such a local input device may be used, for example, to provide rules and information associated with the operation of the payment provider device. The processor 710 may also be in communication with a local output device (not shown in FIG. 7). The local output device may comprise, for example, a display (e.g., a computer monitor), a speaker, and/or a printer. The local output device may be used, for example, to generate reports and/or export information to be used to manage electronic wallets and other information.

The processor 710 is also in communication with a storage device 730. The storage device 730 may comprise any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices.

The storage device 730 stores a program 715 for controlling the processor 710. The program 715 may be stored in a compressed, uncompiled and/or encrypted format. The program 715 may furthermore include other program elements, such as an operating system, a database management system, and/or device drivers used by the processor 710 to interface with peripheral devices. The processor 710 performs instructions of the program 715, and thereby operates in accordance with the present invention. For example, the processor 710 may operate to perform the process of FIG. 4, discussed above. As used herein, information may be "received" by or "transmitted" to, for example: (i) the apparatus 700 from remote device; or (ii) a software application or module within the apparatus 700 from another software application, module, or any other source.

As shown in FIG. 7, the storage device 730 also stores an electronic wallet database 500 (described with respect to FIG. 5), and a transaction database 600 (described with respect to FIG. 6). Those skilled in the art will appreciate that other data items may also be stored or accessible using the apparatus, and that the above data items are shown for illustrating features of some embodiments of the present invention.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. A method for conducting an online transaction by a user operating a computer, comprising:
receiving, by a payment provider computer, an electronic wallet request message that includes payment card data read from a physical payment card and merchant information, the payment card data including a primary account number (PAN) and card specific data, the payment card data received from a remote user computer;
identifying and automatically logging, by the payment provider computer, a user into an electronic wallet associated with said payment card data, to authenticate said user;
identifying, by the payment provider computer, a virtual primary account number (VPAN) associated with said PAN;
creating, by the payment provider computer, dynamic data unique to the online transaction;
creating a purchase request containing said VPAN and the dynamic data;
transmitting said purchase request, by said payment provider computer using the merchant information, to a merchant associated with said online transaction;
receiving an authorization request from the merchant containing said VPAN, the dynamic data, and transaction data;
creating, by the payment provider computer, a replacement authorization request containing said PAN, the dynamic data, and said transaction data;
transmitting the replacement authorization request to an issuer of the physical payment card associated with said PAN for authorization processing;
receiving an authorization response including the PAN and payment related data from said issuer;
replacing, by the payment provider computer, the PAN and the payment related data with the VPAN and VPAN related data to create a replacement authorization response; and
completing, by said payment provider computer, the transaction by providing the replacement authorization response that includes the VPAN and the dynamic data to said merchant.

2. The method of claim 1, wherein said receiving said payment card data is performed over a secure channel with said computer.

3. The method of claim 1, wherein said authenticating the user comprises receiving a password from said user and verifying that said password is associated with said electronic wallet.

4. A payment provider apparatus, comprising:
a processor coupled to a communication device; and
a storage device in communication with said processor and storing instructions adapted to be executed by said processor to process information received from a remote user device to:
identify payment data associated with a physical payment device, said payment data including a primary account number ("PAN") and an expiry date of a payment account associate with said PAN and merchant information;
identify an electronic wallet associated with a remote user operating said remote user device by comparing said payment data with information associated with said electronic wallet;

log the remote user into the electronic wallet;
authenticate an identity of said remote user by comparing information received from said remote user with information stored in said electronic wallet;
create dynamic data unique to an online transaction;
create a purchase request message containing a virtual PAN (VPAN) and the dynamic data;
transmit the purchase request message to a merchant based on the merchant information, said purchase request message including the VPAN and the dynamic data;
receive an authorization request message from said merchant, said authorization request message including said VPAN, the dynamic data, and transaction details;
create a replacement authorization request message including said PAN, the dynamic data, and said transaction details;
transmit the replacement authorization request message to an issuer associated with said PAN;
receive an authorization response message including the PAN and payment related data from said issuer;
replace the PAN and the payment related data with the VPAN and VPAN related data to create a replacement authorization response; and
complete the transaction by transmitting the replacement authorization response message to said merchant, said updated authorization response message including said VPAN and the dynamic data.

5. The apparatus of claim 4, further comprising instructions adapted to be executed by said processor to identify a merchant posting address associated with a transaction between said remote user and said merchant wherein said purchase request message is transmitted to said merchant using said merchant posting address.

6. The apparatus of claim 4, wherein said instructions to identify an electronic wallet further include instructions to verify an identity of said remote user.

7. The apparatus of claim 4, further comprising instructions adapted to be executed by said processor to establish a secure communications session with said remote user device, said secure communications session used to receive said information from said remote user device.

8. The apparatus of claim 4, wherein said VPAN includes a bank identification number identifying an entity associated with said server as the issuer of said VPAN.

9. The apparatus of claim 4, wherein said storage device further stores at least one of an electronic wallet database and a transaction database.

10. The apparatus of claim 4, wherein the communication device coupled to said processor is further adapted to communicate with at least one of: (i) said remote user device, (ii) a merchant device, and (iii) an issuer device.

\* \* \* \* \*